(12) United States Patent
Thörnblom et al.

(10) Patent No.: US 9,904,841 B2
(45) Date of Patent: Feb. 27, 2018

(54) METHOD AND SYSTEM FOR ESTIMATING FINGER MOVEMENT

(71) Applicant: Fingerprint Cards AB, Göteborg (SE)

(72) Inventors: Hans Thörnblom, Kungsbacka (SE); Eric Setterberg, Västra Frölunda (SE)

(73) Assignee: FINGERPRINT CARDS AB, Göteborg (SE)

( * ) Notice: Subject to any disclaimer, the term of this patent is extended or adjusted under 35 U.S.C. 154(b) by 78 days.

(21) Appl. No.: 15/041,656

(22) Filed: Feb. 11, 2016

(65) Prior Publication Data

US 2016/0260225 A1     Sep. 8, 2016

(30) Foreign Application Priority Data

Mar. 6, 2015  (SE) ..................................... 1550281

(51) Int. Cl.
*G06K 9/00*        (2006.01)
*G06F 3/038*       (2013.01)
*G06F 3/0354*      (2013.01)

(52) U.S. Cl.
CPC ....... *G06K 9/00087* (2013.01); *G06F 3/0383* (2013.01); *G06F 3/03547* (2013.01); *G06F 2203/0338* (2013.01); *G06K 9/00006* (2013.01)

(58) Field of Classification Search
USPC ........ 382/107, 124, 218, 219, 220, 278; 1/1; 257/254; 345/177; 310/313 A;

(Continued)

(56) References Cited

U.S. PATENT DOCUMENTS 6,408,087 B1    6/2002  Kramer
7,064,743 B2    6/2006  Nishikawa
(Continued)

FOREIGN PATENT DOCUMENTS

EP        0929028 A2     7/1999
JP     2005327215 A     11/2005
(Continued)

OTHER PUBLICATIONS

International Search Report and Written Opinion for International Application No. PCT/SE2016/050165 dated Sep. 16, 2016, 13 pages.

*Primary Examiner* — Anh H Do
(74) *Attorney, Agent, or Firm* — RMCK Law Group PLC (57) ABSTRACT

The present invention relates to a method of estimating a finger movement direction of a finger, comprising the steps of: a) acquiring a reference fingerprint image; b) acquiring at least one candidate fingerprint image at each acquisition time in a time sequence of acquisition times; c) determining, for each of the acquisition times, a match parameter value for each of a plurality of candidate finger movement directions, the match parameter value being indicative of a correlation between a reference fingerprint image portion and a candidate fingerprint image portion corresponding to displacement in the candidate finger movement direction; d) determining, for each of the candidate finger movement directions, a local extremum match parameter value indicating a maximum correlation for the time sequence of acquisition times; and e) estimating the finger movement based on an evaluation of the determined local extremum match parameters.

16 Claims, 5 Drawing Sheets

(58) Field of Classification Search
USPC .......................................... 360/245.9, 294.4
See application file for complete search history.

(56) References Cited

U.S. PATENT DOCUMENTS

| | | | | |
|---|---|---|---|---|
| 7,725,288 | B2* | 5/2010 | Boillot | G06F 3/0304 |
| | | | | 702/158 |
| 8,998,831 | B2* | 4/2015 | Sankai | A61B 5/04888 |
| | | | | 601/23 |
| 9,477,868 | B1* | 10/2016 | Carling | G06K 9/00013 |
| 9,607,204 | B2* | 3/2017 | Abiko | G06K 9/00026 |
| 2005/0041885 | A1 | 2/2005 | Russo | |
| 2005/0271259 | A1 | 12/2005 | Lorch et al. | |
| 2007/0292007 | A1 | 12/2007 | Neil | |

FOREIGN PATENT DOCUMENTS

| | | | | |
|---|---|---|---|---|
| JP | 2014119825 | * | 6/2014 | ............... G06T 1/00 |
| NO | 2008033264 A2 | | 3/2008 | |

* cited by examiner

METHOD AND SYSTEM FOR ESTIMATING FINGER MOVEMENT

CROSS-REFERENCE TO RELATED APPLICATIONS

This application claims the benefit of Swedish Patent Application No. 1550281-8 filed Mar. 6, 2015. The disclosure of the above application is incorporated herein by reference in its entirety.

FIELD OF THE INVENTION

The present invention relates to a method and system for estimating a finger movement using a fingerprint sensor.

BACKGROUND OF THE INVENTION

Fingerprint sensors are sometimes used as "navigation tools", for example to move a cursor or pointer on a display or to perform selections of items presented on a display etc.

To be able to use a fingerprint sensor for such a navigation tool application, it is necessary to somehow track movement of the finger of a user across the fingerprint sensor.

According to one approach, described in U.S. Pat. No. 6,408,087, ridges and pores of a fingerprint are identified and motion of the ridges and pores between successive images of the fingerprint is detected.

To make the hardware of a fingerprint-based navigation tool low cost and power efficient it is desirable to decrease the fingerprint sensor size as much as possible and to use methods with low requirements on memory and computational complexity.

With that aim, U.S. Pat. No. 7,064,743 discloses a finger movement tracking method based on block matching.

However, there still appears to be room for improvement regarding estimation of a finger movement using a fingerprint sensor, in particular concerning how to achieve sufficient accuracy when using a small fingerprint sensor and tracking methods with low requirements on memory and computational complexity.

SUMMARY

In view of the above-mentioned and other drawbacks of the prior art, it is an object of the present invention to provide for an improved estimation of a finger movement using a fingerprint sensor.

According to a first aspect of the present invention, it is therefore provided a method of estimating a finger movement of a finger using a fingerprint sensor, the method comprising the steps of: a) acquiring a reference fingerprint image at a reference fingerprint image acquisition time; b) acquiring at least one candidate fingerprint image at each candidate fingerprint image acquisition time in a time sequence of candidate fingerprint image acquisition times; c) determining, for each of the candidate fingerprint image acquisition times, a match parameter value for each of a plurality of candidate finger movement directions, the match parameter value being indicative of a correlation between a reference fingerprint image portion corresponding to a reference area of the fingerprint sensor and a candidate fingerprint image portion corresponding to a candidate area of the fingerprint sensor, the candidate area being displaced in the candidate finger movement direction in relation to the reference area; d) determining, for each of the candidate finger movement directions, a local extremum match parameter value indicating a maximum correlation for the time sequence of candidate fingerprint image acquisition times; and e) estimating the finger movement based on an evaluation of the determined local extremum match parameters.

A "finger movement" should be understood as at least one of a finger movement direction and a finger speed.

The candidate area may be displaced a given displacement distance in the candidate finger movement direction in relation to the reference area. Further, the given displacement distance in the candidate finger movement direction may be the same for each of the candidate fingerprint image acquisition times.

The fingerprint sensor may, for example, be a capacitive fingerprint sensor detecting a measure indicative of the capacitive coupling between each sensing element in an array of sensing elements and a finger surface touching the fingerprint sensor surface. Sensing elements at locations corresponding to ridges in the fingerprint will exhibit a stronger capacitive coupling to the finger than sensing elements at locations corresponding to valleys in the fingerprint.

However, the various embodiments of the present invention are not limited to a particular fingerprint sensing technology, but are equally applicable to, for instance, optical, thermal or piezo-electric fingerprint sensors etc.

The candidate fingerprint images are always acquired after acquisition of the reference fingerprint image.

It should be noted that the reference fingerprint image portion and the candidate fingerprint image portion may be of any shape, either continuous or non-continuous. According to one example, each image portion may be a solid rectangle of image pixels, and according to another example, each image portion may be a set of distributed image pixels.

Using an analogy from a compass, the candidate finger movement directions may, for example, include north, northwest, west, southwest, etc.

In the context of the present application, a "fingerprint image portion" may be the entire acquired fingerprint image, or a part thereof.

The match parameter value indicating the correlation between a candidate fingerprint image portion and the reference fingerprint image portion may be higher or lower for a stronger correlation (similarity) between the candidate fingerprint image portion and the reference fingerprint image portion.

According to one example, the match parameter value may be a measure of the difference between the candidate fingerprint image portion and the reference fingerprint image portion. In that case, a lower value of the match parameter value indicates a stronger correlation between the fingerprint image portions, and the local extremum indicating a maximum correlation will be a local minimum. Analogously, the match parameter value may be a measure of the correspondence or likeness between the fingerprint image portions, and in that case the local extremum indicating a maximum correlation will be a local maximum.

According to embodiments of the present invention at least two candidate finger movement directions that exhibit local extrema indicating maximum correlations, in respect of time, for the respective candidate finger movement directions may be evaluated.

The present invention is based upon the realization that the combination of typical properties of fingerprints and a very small fingerprint sensor may make it difficult to correctly estimate the finger movement direction and speed. In particular in the periphery of a fingerprint pattern, ridges may be near parallel to each other at least inside the sensing area covered by a very small fingerprint sensor. Movement in directions substantially in parallel with the ridges may then be very difficult to distinguish from each other using known matching techniques.

The present inventors have now realized that, since ridges in a fingerprint are practically never perfectly parallel, it will be possible to accurately estimate the finger movement, even when using simple matching methods.

According to embodiments of the present invention, this is achieved by evaluating several different candidate finger movement directions until each of these candidate finger movement directions has reached the maximum correlation, i.e. best correspondence, for that particular candidate finger movement direction. By evaluating the different maximum correlations, it is then possible to determine which candidate finger movement direction had the best match of the different possible directions.

The finger movement direction may then be estimated to mainly be in the candidate finger movement direction with the best match. For instance, the finger movement direction may be estimated to be somewhere between two adjacent candidate finger movement directions, or the finger movement direction may simply be estimated to correspond to the 'best' candidate finger movement direction. The estimated finger movement direction may be the result of an averaging operation, in which the candidate finger movement direction with the best match may be given the most weight.

According to various embodiments, each candidate area may be displaced by a respective known displacement distance in relation to the reference area; and step b) may comprise acquiring the candidate fingerprint images with an acquisition frequency resulting in acquisition of at least three candidate fingerprint images during the time needed for the finger to move the displacement distance.

A finger navigation system will typically be designed for an estimated maximum finger speed. During the time needed for the finger to move the above-mentioned displacement distance at that maximum finger speed, at least three candidate fingerprint images should preferably be acquired. During the same period of time, a time sequence of at least three match parameter values should be determined, to make it possible to at least roughly determine a local extremum for the time sequence of match parameter values.

For a fingerprint sensor with an array of sensing elements arranged with a sensing element pitch (distance between the centers of adjacent sensing elements in a row or column of the array of sensing elements in the fingerprint sensor) the shortest possible displacement distance may be the sensing element pitch.

As a reasonable example, the sensing element pitch can be assumed to be about 50 µm, which is common for fingerprint sensor, and the lowest maximum finger speed for acceptable performance for a finger navigation system may be about 5 cm/s.

Accordingly, at least three candidate fingerprint images may advantageously be acquired during the time needed for a finger moving at 5 cm/s to move 50 µm, which translates to at least 3000 candidate fingerprint images per second.

To further improve performance of the finger navigation system, the finger navigation system may advantageously be designed for a maximum finger speed of at least about 10 cm/s, which, with a sensing element pitch of 50 µm translates to acquiring and processing at least about 6000 candidate fingerprint images per second. It may also be beneficial to acquire significantly more than three candidate fingerprint images during the time needed for the finger to move the displacement distance. For instance, it may be advantageous to acquire at least five candidate fingerprint images during that time. For the examples given above, that would correspond to at least 5000, and at least 10000 candidate fingerprint images per second, respectively.

According to various embodiments, furthermore, each candidate area may be displaced by a respective known displacement distance in relation to the reference area; and step e) may comprise estimating a speed of the finger based on the evaluation of the determined local extremum match parameters, and the known displacement distances.

The evaluation of the local extremum match parameters will give an indication of the direction of finger movement as well as the time needed for the finger to move the known displacement distance in that direction.

From the time and the known displacement distance, the finger movement speed can be estimated. As was described above, the finger movement direction may be estimated to be between two candidate finger movement directions, and the distance and time, or finger movement speed, may be estimated based on such a direction, for example through averaging.

In various embodiments, the known displacement distance may correspond to one or several sensing element(s) in each candidate finger movement direction. In the row/column directions, the displacement distance will then be a multiple of the sensing element pitch, and in a diagonal direction, the displacement direction will be longer, such as the multiple of the sensing element pitch time the square root of two for a square candidate area etc.

According to embodiments, furthermore, the above-mentioned steps a) to e) may advantageously be performed several times in sequence, in order to continuously track the finger movement. The result may be a series of momentary finger movement estimations. Improved finger movement estimations may be based on several momentary finger movement estimations. For instance, such an improved finger movement estimation may be based on a present momentary finger movement estimation together with one or several previously determined momentary finger movement estimations. For example, an approximately constant finger movement speed may result in fluctuating momentary finger speed estimations due to quantization errors. In such a case, the estimation of the finger movement speed may be improved based on an averaging (advantageously a weighted averaging) of several momentary finger movement estimations.

As an alternative or complement to performing several momentary finger movement estimation operations in sequence, several momentary finger movement estimation operations may be performed at least partly simultaneously. In other words, the time sequences during which candidate fingerprint images area acquired may overlap for different momentary finger movement estimation operations.

Furthermore, it should be noted that a candidate fingerprint image in one momentary finger movement estimation operation may be used as the reference fingerprint image in another momentary finger movement estimation operation.

The estimation of the finger movement may be improved even further by introducing a varying delay (time period) between the reference fingerprint image acquisition time and the first candidate fingerprint image acquisition time for the different momentary finger movement estimations. This is particularly the case for high finger movement speeds where a quantization error due to the pixel configuration of the reference image portion and the candidate image portion may result in a relatively large error in terms of speed.

Hence, a first navigation sequence may exhibit a first time period between the reference fingerprint image acquisition time and a first candidate fingerprint image acquisition time in the time sequence; and the second navigation sequence exhibits a second time period, different from the first time period, between the reference fingerprint image acquisition time and a first candidate fingerprint image acquisition time in the time sequence.

The estimation of the finger movement, in particular the finger speed, may then additionally be based on the first time period and the second time period. The above-mentioned time period may vary between a rather large number of different time periods, such as at least four different time periods, according to a predetermined pattern. This will make it possible to determine which of the different time periods results in a best correspondence between a particular candidate fingerprint acquisition time and the finger movement time needed for the finger to move the above-mentioned displacement distance at the finger speed to be estimated.

According to various embodiments, each of the acquired candidate fingerprint images may comprise a plurality of different candidate fingerprint image portions corresponding to displacement in different candidate finger movement directions.

In these embodiments, a different candidate fingerprint image portion of an acquired candidate fingerprint image may be correlated with the reference fingerprint image portion to determine match parameter values for each candidate finger movement direction. From this follows that each candidate fingerprint image portion is smaller (comprises fewer pixels) than the full candidate fingerprint image.

Moreover, the reference fingerprint image may comprise a plurality of different reference fingerprint image portions corresponding to displacement in different candidate finger movement direction in relation to a single candidate fingerprint image portion.

As an alternative to the above-described embodiments, the candidate fingerprint image portion may then, for example, be constituted by the entire acquired candidate fingerprint image. The candidate fingerprint image portion may be correlated with different reference fingerprint image portions to determine match parameters for each candidate finger movement direction. In these embodiments, a smaller (in number of pixels) candidate fingerprint image may be acquired. Since candidate fingerprint images may, as was described above, advantageously be acquired with a rather high acquisition frequency (such as at least 3000 images per second), a smaller candidate fingerprint image will result in reduced processing, which may in turn provide for reduced complexity and/or reduced energy consumption and/or improved performance in terms of maximum finger speed for the finger navigation system.

Hybrid embodiments in which the reference fingerprint image comprises a plurality of reference fingerprint image portions and each candidate fingerprint image comprises a plurality of candidate fingerprint image portions may also be advantageous depending on application.

To facilitate the determination of match parameter values, the reference fingerprint image portion and each candidate fingerprint image portion may advantageously have the same spatial configuration (height, width, pixel distribution etc). Accordingly, the candidate area may advantageously have the same sensing element configuration as the reference area.

The reference and candidate areas may advantageously include less than one hundred sensing elements, which allows for use of a very small fingerprint sensor.

According to embodiments, the match parameter value for each of the plurality of candidate finger movement directions may be determined using a block matching algorithm.

The match parameter value may, for example, be the output of a so-called cost function. Well known cost functions include, for instance the sum of absolute differences, the mean absolute difference, the sum of squared errors, and the mean squared error.

When a finger movement (direction and/or speed) has been estimated, a signal indicative thereof may be provided to an external control unit for controlling an electronic device based on the detected finger movement.

According to a second aspect of the present invention, there is provided a finger navigation system for estimating a finger movement of a finger, the finger navigation system comprising: a fingerprint sensor comprising an array of sensing elements; and processing circuitry including: fingerprint image acquisition circuitry for acquiring fingerprint images; fingerprint image matching circuitry for determining a match parameter value indicative of a correlation between acquired fingerprint images; a memory; and estimation circuitry for estimating the finger movement based on match parameter values, wherein, when the finger moves across the sensing area of the fingerprint sensor: the fingerprint image acquisition circuitry acquires a reference fingerprint image at a reference fingerprint image acquisition time, and at least one candidate fingerprint image at each candidate fingerprint image acquisition time in a time sequence of candidate fingerprint image acquisition times; the fingerprint image matching circuitry determines, for each of the candidate fingerprint image acquisition times, a match parameter value for each of a plurality of candidate finger movement directions, the match parameter value being indicative of a correlation between a reference fingerprint image portion corresponding to a reference area of the fingerprint sensor and a candidate fingerprint image portion corresponding to a candidate area of the fingerprint sensor, the candidate area being displaced in the candidate finger movement direction in relation to the reference area; the fingerprint image matching circuitry stores in the memory, for each of the candidate finger movement directions, at least a local extremum match parameter value indicating a maximum correlation for the time sequence of candidate fingerprint image acquisition times; and the estimation circuitry estimates the finger movement based on an evaluation of the local extremum for each of the candidate finger movement directions.

Advantageously, the fingerprint acquisition circuitry may be configured to acquire at least 3000 candidate fingerprint images per second.

According to various embodiments, furthermore, the fingerprint sensor and at least the fingerprint image acquisition circuitry, the fingerprint image matching circuitry and the memory may be provided as a single semiconductor component. This provides for a low-cost finger navigation system, which is very compact and has a low power consumption.

Furthermore, for high fingerprint sensing performance and robustness, each of the sensing elements may comprise: a protective dielectric top layer to be touched by the finger; an electrically conductive sensing structure arranged underneath the top layer; and charge measuring circuitry connected to the sensing structure for providing a sensing signal indicative of a change of a charge carried by the sensing structure resulting from a change in a potential difference between the finger and the sensing structure. The charge measuring circuitry may comprise a charge amplifier.

Further embodiments of, and effects obtained through this second aspect of the present invention are largely analogous to those described above for the first aspect of the invention.

In summary, the present invention relates to a method of estimating a finger movement direction of a finger, comprising the steps of: a) acquiring a reference fingerprint image; b) acquiring at least one candidate fingerprint image at each acquisition time in a time sequence of acquisition times; c) determining, for each of the acquisition times, a match parameter value for each of a plurality of candidate finger movement directions, the match parameter value being indicative of a correlation between a reference fingerprint image portion and a candidate fingerprint image portion corresponding to displacement in the candidate finger movement direction; d) determining, for each of the candidate finger movement directions, a local extremum match parameter value indicating a maximum correlation for the time sequence of acquisition times; and e) estimating the finger movement based on an evaluation of the determined local extremum match parameters.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

Figure 1:
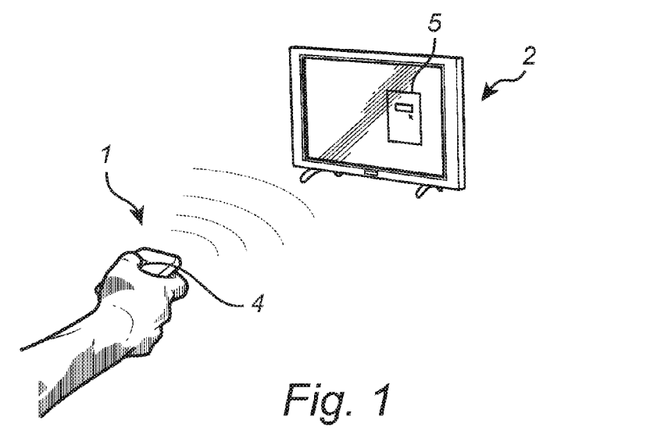
FIG. 1 schematically shows an exemplary application for the finger navigation system according to embodiments of the present invention, in the form of a remote control for a television set.

FIG. 1 schematically shows an example application for the finger navigation system according to embodiments of the present invention, in the form of a remote control device 1 for controlling operation of a television set 2. It should be noted that the remote control device 1 is an example application only, and that the finger navigation system according to embodiments of the present invention could equally well be included in other electronic devices, such as mobile phones or computers etc, as long as movement of the user's finger across the fingerprint sensor is used for controlling operation of the electronic device.

Referring to FIG. 1, the remote control device 1 comprises a finger navigation system 4, and a wireless transmitter, such as an infrared LED (not shown in FIG. 1). The television set 2 comprises a wireless receiver, such as a photodetector (not shown) for receiving signals transmitted by the remote control device 1. Based on the received signals, the television set 2 may be controlled to, for example, change channels or, as is schematically indicated in FIG. 1, select among options in a menu dialog 5.

Figure 2:
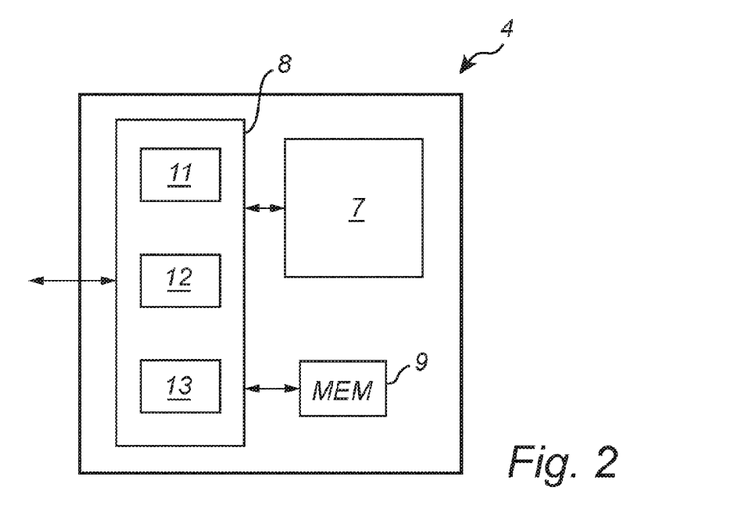
FIG. 2 is a schematic block diagram of the finger navigation system comprised in the remote control in FIG. 1.

Referring to FIG. 2, which is a schematic block diagram of the finger navigation system comprised in the remote control device 1 in FIG. 1, the finger navigation system 4 comprises a fingerprint sensor 7, and processing circuitry. The processing circuitry is here shown to include a microprocessor 8 and a memory 9. It should be understood that the processing circuitry may equally well be at least partly implemented as an ASIC, and that the finger navigation system 4 in FIG. 2 may be provided as a single integrated circuit.

In the block diagram of FIG. 2, the microprocessor is indicated as comprising fingerprint image acquisition circuitry 11, fingerprint image matching circuitry 12, and estimation circuitry 13.

Figure 3:
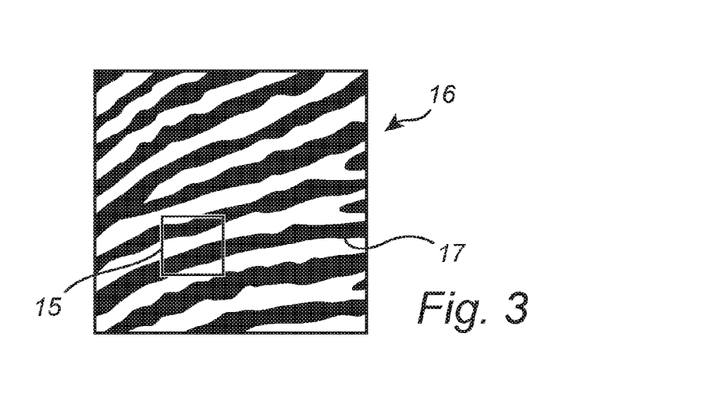
FIG. 3 is an example illustration of a fingerprint image acquired using the fingerprint sensor of the finger navigation system in FIG. 1 and FIG. 2.

In embodiments of the finger navigation system 4 according to the present invention, the fingerprint sensor 7 may be very small to enable the finger navigation system to be very compact and cost-efficient. To put a possible size of the example fingerprint sensor 7 in perspective, a fingerprint portion 15 corresponding to a 10×10 sensing element sensing area of the fingerprint sensor 7 is indicated in an exemplary fingerprint pattern 16 in FIG. 3. As can be understood from FIG. 3, the fingerprint sensor 7 is very small in comparison to fingerprint features, and especially for finger movement directions substantially in parallel with the fingerprint ridges 17, it may be difficult to accurately estimate the finger movement direction. For example, for the situation in FIG. 3, it may be difficult to distinguish between movement in the southwest and northeast directions. Embodiments of the present invention provide for a more accurate estimation of the finger movement direction as described herein.

A method of estimating a finger movement direction according to an example embodiment of the present invention, using the finger navigation system in FIG. 2, will now be described with reference to the schematic flow-chart in FIG. 4, as well as to the illustrations provided in FIG. 5 and FIG. 6.

In a first step 100, a reference fingerprint image is acquired from the fingerprint sensor 7 by the fingerprint image acquisition circuitry 11. The reference fingerprint image of the present finger movement estimation is acquired at a reference image acquisition time $t_r$.

In the subsequent step 101, a candidate fingerprint image is acquired from the fingerprint sensor 7 by the fingerprint acquisition circuitry 11 at an nth candidate image acquisition time $t_{cn}$, starting at a first candidate image acquisition time $t_{c1}$ separated from the reference image acquisition time $t_r$ by a time period. This time period between the reference image acquisition time $t_r$ and the first candidate image acquisition time $t_{c1}$ may, according to embodiments, be different for different finger movement estimations as will be described in more detail further below.

After having acquired the reference fingerprint image and the $n^{th}$ candidate fingerprint image, the method proceeds to step 102 to determine a match parameter value for each of a plurality of candidate finger movement directions based on a correlation between a reference fingerprint image portion (of the reference fingerprint image) corresponding to a reference area of the fingerprint sensor 7 and a candidate fingerprint image portion (of the candidate fingerprint image) corresponding to a candidate area of the fingerprint sensor 7. For each of the candidate finger movement directions, the candidate area is displaced in the candidate finger movement direction in relation to the reference area.

Additional explanation of relations between the reference finger print image, the reference fingerprint portion(s), the reference area(s), the candidate fingerprint image, the candidate fingerprint image portion(s), and the candidate area(s) will be provided below with reference to FIG. 5.

Figure 5:
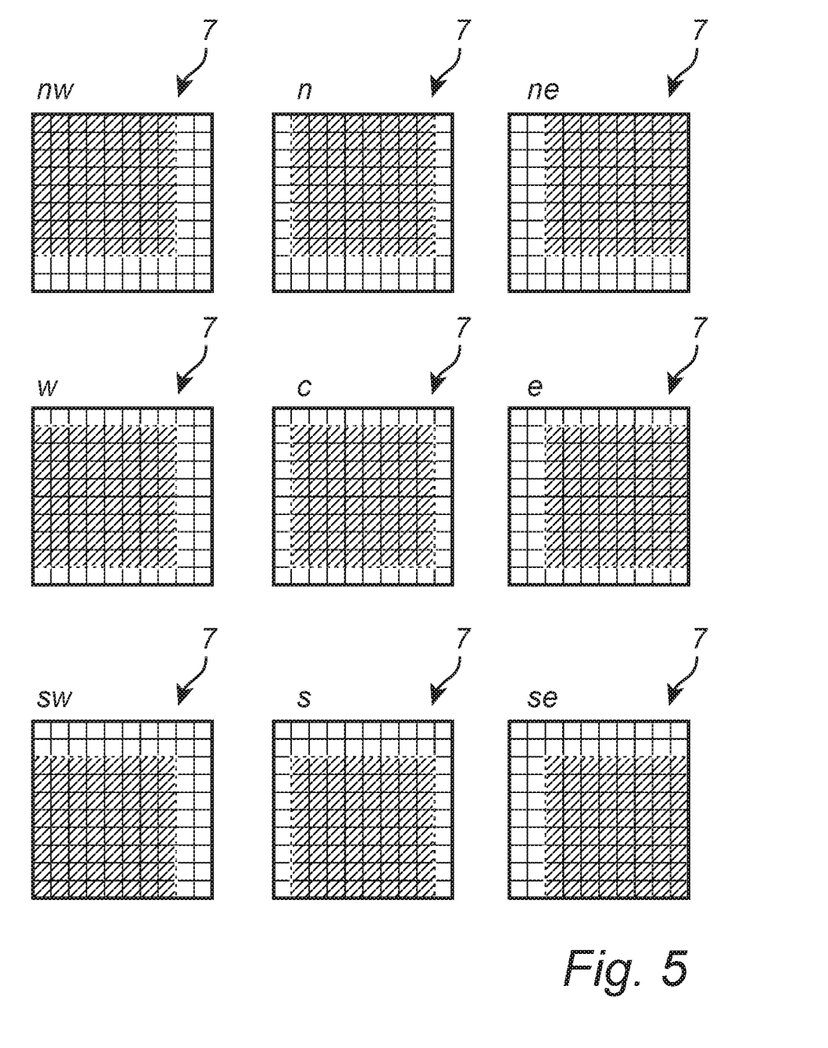
FIG. 5 schematically illustrates an example of a fingerprint sensor used in the method of FIG. 4 and candidate finger movement directions.

FIG. 5 schematically illustrates one example of the fingerprint sensor 7 comprised in the finger navigation system 4 in FIG. 2 (or a part of the fingerprint sensor 7 in FIG. 2). To aid the explanation of the different candidate finger movement directions, the reference area(s), and candidate area(s), nine illustrations of the fingerprint sensor 7 are provided in FIG. 5. Each of these fingerprint sensors has a different hatched area of sensing elements, and the fingerprint sensor illustrations are identified by an indication of their respective hatched area, as center (c), northwest (nw), north (n), northeast (ne), west (w), east (e), southwest (sw), south (s), and southeast (se).

In the example of FIG. 5, the fingerprint sensor 7 has a sensing area comprising one hundred sensing elements arranged in a 10×10 sensing element array, and each of the hatched areas is formed by 8×8 sensing elements.

According to one embodiment, the reference fingerprint image acquired in step 100 may be acquired using the 8×8 sensing elements forming the center (c) hatched area, which is then the reference area. In this embodiment, each candidate fingerprint image acquired in step 101 may be acquired using the 10×10 sensing elements indicated as the fingerprint sensor 7 in FIG. 5. Each candidate fingerprint image can then be said to include eight different candidate fingerprint image portions, each corresponding to a candidate area (the hatched areas denoted in FIG. 5 by the different directions of a compass) being displaced in a different candidate finger movement direction in relation to the reference area.

According to another embodiment, the reference fingerprint image acquired in step 100 may be acquired using the full 10×10 sensing element fingerprint sensor, while each candidate fingerprint image acquired in step 101 may be acquired using a candidate area formed by the 8×8 sensing elements indicated by the center (c) hatched area.

In this embodiment, the reference fingerprint image can be said to include eight different reference fingerprint image portions, each corresponding to a reference area (the hatched areas denoted in FIG. 5 by the different directions of a compass) being displaced in a different candidate finger movement direction in relation to the candidate area (which is obviously equivalent to the candidate area being displaced in relation to the reference areas).

For the lateral candidate finger movement directions (north, west, east and south), the displacement distance in relation to the reference area equals the sensing element pitch (which may for example be about 50 µm), and for the diagonal candidate finger movement directions (northwest, northeast, southwest and southeast), the displacement distance in relation to the reference area equals the sensing element pitch times the square root of two (about 70 µm for a sensing element pitch of 50 µm).

Figure 4:
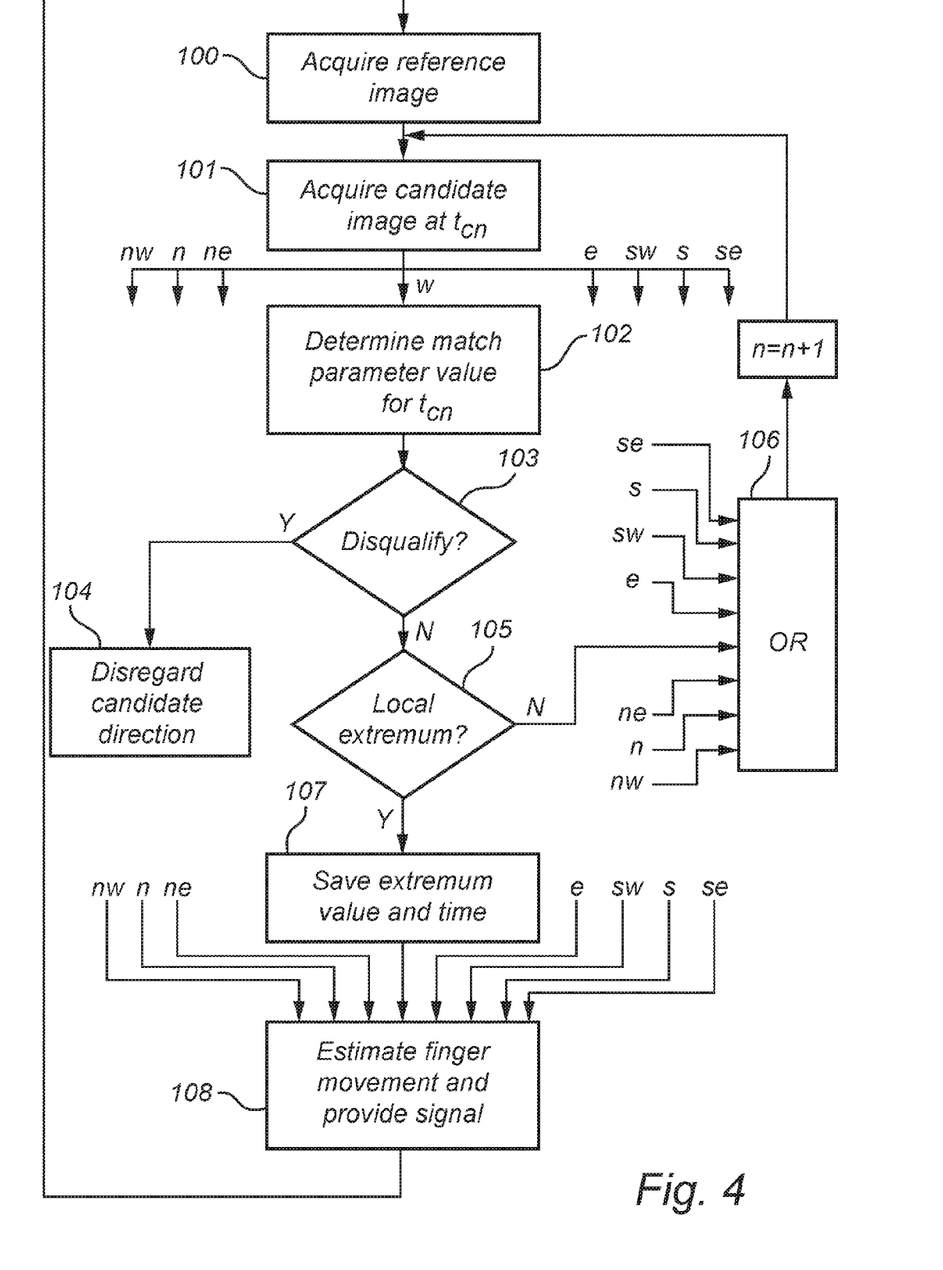
FIG. 4 is a flow-chart schematically illustrating a method of estimating a finger movement according to an example embodiment of the present invention.

Returning to the flow-chart in FIG. 4, match parameter values indicating the correlation between candidate fingerprint image portions and the reference fingerprint image portion are determined separately for each candidate finger movement direction. This is schematically indicated in the flow-chart of FIG. 4 by the branch-out following step 101. The steps carried out individually for each candidate finger movement direction will be described for one of the finger movement directions, say west (w). It should be understood that the remaining candidate finger movement directions are treated analogously.

Accordingly, the above-described step 102 of determining a match parameter value is carried out separately for each candidate finger movement direction, at least for the first candidate fingerprint image acquisition time $t_{c1}$.

As was described in the Summary section above, the match parameter value may be any suitable value that indicates a correlation between two images. In the presently illustrated example, the sum of absolute differences (deviation) of all 8×8 pixels of the candidate fingerprint image portion and the reference fingerprint image portion is used as match parameter value.

In the next step 103, it is determined based on the development of the match parameter value since the last match parameter value if the candidate finger movement direction should be disqualified. If this it is the case, then the method proceeds to step 104 and the candidate fingerprint direction is disregarded.

If it is not determined in step 103 that the candidate finger movement direction is disqualified and should be disregarded, then the method proceeds to step 105 where it is determined if a local extremum for the candidate finger movement direction has been reached or not.

If it is determined in step 105 that a local extremum for the match parameter value has not been reached, the method proceeds to step 106, where it is checked if there is any candidate finger movement direction that has neither been disqualified nor reached its local extremum. If this is the case, the method proceeds to acquire a new candidate image at the next candidate fingerprint image acquisition time $t_{cn+1}$ in step 101.

If it is instead determined in step 105 that a local extremum value of the match parameter value has been reached, then the local extremum value and the corresponding candidate fingerprint acquisition time are saved to memory 9 in step 107. It should be noted that the local extremum value and corresponding time will typically relate to a previous candidate fingerprint image acquisition, such as the acquisition at the preceding candidate fingerprint image acquisition time $t_{cn-1}$.

Based on the determined local extremum values and corresponding times determined for the different candidate finger movement directions, the estimation circuitry 13 estimates the finger movement and provides a signal indicative thereof in the next step 108. With the conclusion of step 108, the present finger navigation sequence is complete and the next navigation sequence is started.

An example of how it may be determined if a candidate finger movement direction is disqualified, or if a local extremum has been reached, or if additional candidate fingerprint image acquisitions are needed will be provided further below with reference to FIG. 6.

Figure 6:
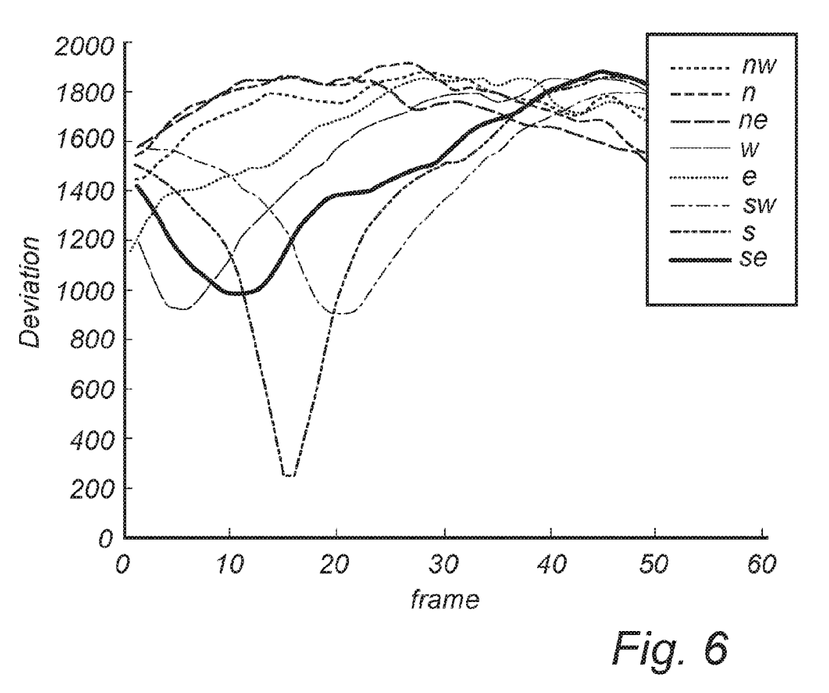
FIG. 6 schematically illustrates the development over time of the deviation between candidate fingerprint images and the reference fingerprint image.

Examples of the development over time of the match parameter values (in this case deviations) for the different candidate finger movement directions are shown in FIG. 6, where the different candidate finger movement directions are denoted by different points of the compass as was also described above with reference to FIG. 5.

For candidate finger movement directions where the match parameter values already initially indicate a decreasing correlation (increasing deviation), it is determined in step 103 that there is no need for further analysis and that the candidate finger movement directions should be disregarded. In the exemplary case illustrated in FIG. 6, the disregarded candidate finger directions would be northwest, north, northeast and east.

If, however, the determined match parameter values at least initially indicate an increasing correlation (decreasing deviation), the candidate finger movement direction may be the actual finger movement direction, and further analysis should be performed. This is indicated in the flow-chart by step 105, in which it is determined whether or not the correlation continues to increase or if a local extremum has been reached.

In the example of FIG. 6, the local minimum for the deviation is determined for each of the directions west, southwest, south, and southeast, and based on the local minima for these directions, the finger movement is estimated in step 108. In this case, it is determined that the candidate movement direction "south" exhibits the best correlation at approximately the $16^{th}$ candidate fingerprint image acquisition time $t_{c16}$. Hence, the finger movement is estimated in step 108, by the estimation circuitry 13, to be in the "south" direction and with a finger speed that can be approximated by the relation:

$$1 \times \text{sensing element pitch}/t_{c16}$$

It should be noted that the local extremum (minimum for the deviation in FIG. 6) for each candidate finger movement direction having such a local extremum should preferably be identified. To that end, a sufficient number of candidate fingerprint images should preferably be acquired (and at a sufficient frame rate). In the example of FIG. 6, at least approximately 23 frames should be acquired to identify the local minimum for each of the directions west, southwest, south, and southeast.

As was explained above in connection with the flow-chart in FIG. 4, the method according to embodiments of the invention may typically be performed repeatedly as long as a moving finger is detected on the fingerprint sensor 7. Each time the method is performed, a signal indicative of the finger movement (advantageously direction and speed) is provided and can be used for controlling operation of an electronic device.

In the explanation of the method provided above, it was mentioned that, according to embodiments, the time period between the reference image acquisition time $t_r$ and the first candidate image acquisition time $t_{c1}$ may be different for different finger movement estimations.

Figure 7A:
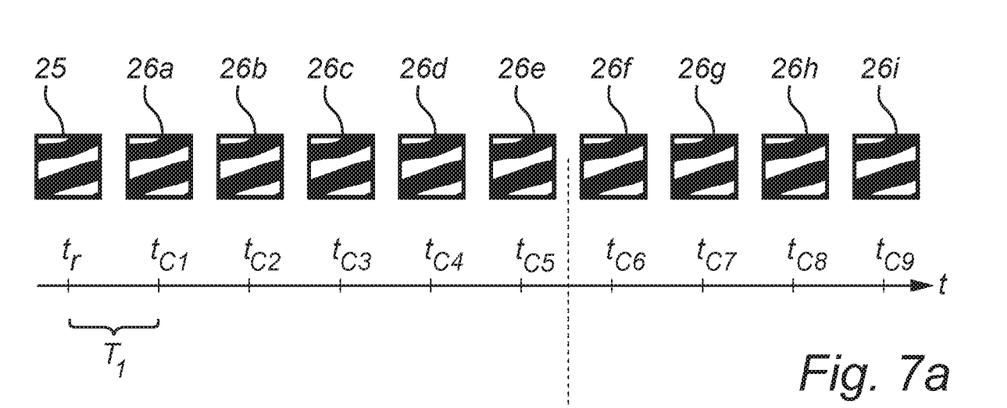
FIGS. 7a-b schematically illustrate an improved determination of the finger speed obtained by varying the time period between acquisition of the reference fingerprint image and the first candidate fingerprint image for different finger movement estimations.
Figure 7B:
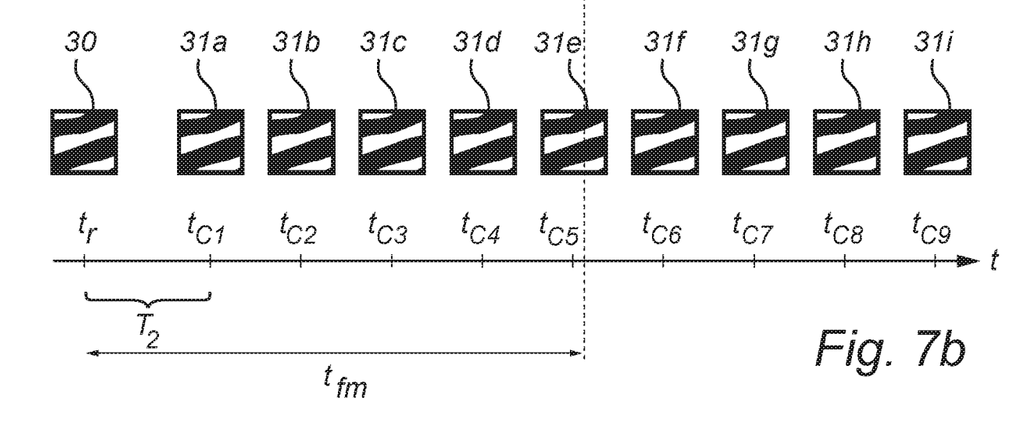

An example embodiment using such temporal dithering will now be described with reference to FIGS. 7a-b schematically illustrating two different finger movement estimations with different time periods between the reference image acquisition time $t_r$ and the first candidate image acquisition time $t_{c1}$.

FIG. 7a schematically shows the fingerprint image acquisition timing of a first finger movement estimation, where a reference fingerprint image 25 is acquired at the reference image acquisition time $t_r$. After a first time period $T_1$, a time sequence of candidate fingerprint images 26a-i is acquired at candidate fingerprint acquisition times $t_{c1}$-$t_{c9}$.

In the second finger movement estimation, schematically shown in FIG. 7b, there is a second time period $T_2$, different from the first time period $T_1$, from acquisition of the reference fingerprint image 30 to the acquisition of the first candidate fingerprint image 31a. As in FIG. 7a, a time sequence of candidate fingerprint images 31a-i is acquired at candidate fingerprint acquisition times $t_{c1}$-$t_{c9}$.

As is schematically indicated in FIGS. 7a-b, it may, for an exemplary case take the finger of the user a certain finger movement time $t_{fm}$ to move the above-mentioned displacement distance. In this case, the time sequences in FIGS. 7a-b are related to candidate fingerprint images taken with a candidate sensor area displaced from the reference sensor area in the direction of finger movement.

With the first time period $T_1$ in FIG. 7a, the finger movement time $t_{fm}$ is approximately in the middle between the fifth and sixth candidate image acquisition times.

With this particular finger speed and a constant time period (the first time period $T_1$) being used for each finger movement estimation, it follows that the finger navigation system may sometimes indicate the finger speed to be $D/(t_{c5}-t_r)$, and sometimes $D/(t_{c6}-t_r)$, due to very small variations in finger speed. Particularly for a relatively high finger speed, this means that a rather small change in actual finger speed may translate to a substantial change in the finger speed estimated by the finger navigation system.

By instead using different time periods between the reference fingerprint acquisition time $t_r$ and the first candidate fingerprint acquisition time $t_{c1}$, it will be possible to achieve a more stable estimation of the finger speed, in particular for high finger speeds.

As can be understood from FIG. 7b, the second time period $T_2$ will result in the finger movement time $t_{fm}$ being much closer to the fifth candidate fingerprint acquisition time, so that a small change in finger speed will not result in a substantial change in the finger speed estimated in the second finger movement estimation.

By using several known and different time periods between the reference fingerprint acquisition time $t_r$ and the first candidate fingerprint acquisition time $t_{c1}$, finger movement estimations resulting in large and fast fluctuations in the estimated finger speed can be disregarded, and the finger speed can be more accurately and reliably estimated based on finger movement estimations indicating a more stable finger speed.

Although described above in connection with a finger navigation method involving determining local extrema of match parameter values and estimating finger movement based on the determined local extrema, it should be noted that this improved method of estimating finger speed by varying the time period between a reference fingerprint image acquisition time and a first candidate fingerprint acquisition time may equally well be applicable to other situations in which there is a desire to improve the estimation of finger speed based on a time sequence of acquired fingerprint images. For instance, embodiments of the above-described temporal dithering may be useful for improving estimation of finger speed in connection with determining the spatial relationship between fingerprint features extracted from fingerprint images acquired using a fingerprint sensor system of the swipe type.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A method of estimating a finger movement of a finger using a fingerprint sensor, said method comprising the steps of:
   a) acquiring a reference fingerprint image at a reference fingerprint image acquisition time;
   b) acquiring at least one candidate fingerprint image at each candidate fingerprint image acquisition time in a time sequence of candidate fingerprint image acquisition times;
   c) determining, for each of said candidate fingerprint image acquisition times, a match parameter value for each of a plurality of candidate finger movement directions, said match parameter value being indicative of a correlation between a reference fingerprint image portion corresponding to a reference area of said fingerprint sensor and a candidate fingerprint image portion corresponding to a candidate area of said fingerprint sensor, said candidate area being displaced a given displacement distance in said candidate finger movement direction in relation to said reference area, said given displacement distance in said candidate finger movement direction being the same for each of said candidate fingerprint image acquisition times;
   d) determining, for each of said candidate finger movement directions exhibiting a local extremum indicating a maximum correlation for said time sequence of candidate fingerprint image acquisition times, a local extremum match parameter value indicating said maximum correlation; and
   e) estimating said finger movement based on an evaluation of said determined local extremum match parameters,
   wherein step e) comprises estimating a direction of said finger movement to mainly correspond to that candidate finger movement direction of said plurality of different candidate finger movement directions determined to exhibit the strongest maximum correlation.

2. The method according to claim 1, wherein:
   each candidate area is displaced by a respective known displacement distance in relation to said reference area;
   step b) comprises acquiring said candidate fingerprint images with an acquisition frequency resulting in acquisition of at least three candidate fingerprint images during the time needed for said finger to move said displacement distance.

3. The method according to claim 2, wherein said acquisition frequency is at least 3000 candidate fingerprint images per second.

4. The method according to claim 1, wherein:
   each candidate area is displaced by a respective known displacement distance in relation to said reference area; and step e) comprises estimating a speed of said finger based on said evaluation of said determined local extremum match parameters, and said known displacement distances.

5. The method according to claim 4, wherein said speed is estimated based on an elapsed time between said reference fingerprint image acquisition time and that candidate fingerprint image acquisition time corresponding to the local extremum match parameter value indicating the strongest maximum correlation among said determined local extremum match parameters.

6. The method according to claim 1, wherein said steps a) to e) are performed a first time in a first navigation sequence and a second time in a second navigation sequence.

7. The method according to claim 6, wherein:
   said first navigation sequence exhibits a first time period between said reference fingerprint image acquisition time and a first candidate fingerprint image acquisition time in said time sequence; and
   said second navigation sequence exhibits a second time period, different from said first time period, between said reference fingerprint image acquisition time and a first candidate fingerprint image acquisition time in said time sequence.

8. The method according to claim 7, wherein the estimation of said finger movement is additionally based on said first time period and said second time period.

9. The method according to claim 1, wherein each of said acquired candidate fingerprint images comprises a plurality of different candidate fingerprint image portions.

10. The method according to claim 1, wherein said reference fingerprint image comprises a plurality of different reference fingerprint image portions corresponding to displacement in different candidate finger movement direction in relation to a single candidate fingerprint image portion.

11. The method according to claim 1, wherein said candidate area has the same dimensions as said reference area.

12. The method according to claim 1, wherein the match parameter value for each of said plurality of candidate finger movement directions is determined using a block matching algorithm.

13. The method according to claim 1, further comprising the step of:
   f) providing a signal indicative of said estimated finger movement.

14. A finger navigation system for estimating a finger movement of a finger, said finger navigation system comprising:
   a fingerprint sensor comprising an array of sensing elements; and
   processing circuitry including:
      fingerprint image acquisition circuitry for acquiring fingerprint images;
      fingerprint image matching circuitry for determining a match parameter value indicative of a correlation between acquired fingerprint images;
      a memory; and
      estimation circuitry for estimating said finger movement based on match parameter values,
   wherein, when said finger moves across said sensing area of the fingerprint sensor:
      said fingerprint image acquisition circuitry acquires a reference fingerprint image at a reference fingerprint image acquisition time, and at least one candidate fingerprint image at each candidate fingerprint image acquisition time in a time sequence of candidate fingerprint image acquisition times;

said fingerprint image matching circuitry determines, for each of said candidate fingerprint image acquisition times, a match parameter value for each of a plurality of candidate finger movement directions, said match parameter value being indicative of a correlation between a reference fingerprint image portion corresponding to a reference area of said fingerprint sensor and a candidate fingerprint image portion corresponding to a candidate area of said fingerprint sensor, said candidate area being displaced a given displacement distance in said candidate finger movement direction in relation to said reference area, said given displacement distance in said candidate finger movement direction being the same for each of said candidate fingerprint image acquisition times;

said fingerprint image matching circuitry stores in said memory, for each of said candidate finger movement directions exhibiting a local extremum indicating a maximum correlation for said time sequence of candidate fingerprint image acquisition times, at least a local extremum match parameter value indicating said maximum correlation; and said estimation circuitry estimates said finger movement based on an evaluation of said local extremum match parameter values to mainly correspond to that candidate finger movement direction of said plurality of different candidate finger movement directions determined to exhibit the strongest maximum correlation.

15. The finger navigation system according to claim 14, wherein said fingerprint acquisition circuitry is configured to acquire at least 3000 candidate fingerprint images per second.

16. The finger navigation system according to claim 14, wherein each of said sensing elements comprises:
- a protective dielectric top layer to be touched by said finger;
- an electrically conductive sensing structure arranged underneath said top layer; and
- charge measuring circuitry connected to said sensing structure for providing a sensing signal indicative of a change of a charge carried by said sensing structure resulting from a change in a potential difference between said finger and said sensing structure.

* * * * *